United States Patent
Mack et al.

(10) Patent No.: US 6,324,917 B1
(45) Date of Patent: Dec. 4, 2001

(54) COMBINATION AIR PIPE CONNECTOR AND FLOW MEASUREMENT DEVICE

(75) Inventors: Dean T. Mack, Los Altos; Edward R. McCourt, Palo Alto; James T. Lindow, Saratoga, all of CA (US)

(73) Assignee: Mark Products, Inc., Sunnyvale, CA (US)

( * ) Notice: Subject to any disclaimer, the term of this patent is extended or adjusted under 35 U.S.C. 154(b) by 0 days.

(21) Appl. No.: 09/266,302

(22) Filed: Mar. 11, 1999

(51) Int. Cl.$^7$ .................................. G01F 1/37; G01F 1/42
(52) U.S. Cl. ...................................... 73/861.52; 73/861.61
(58) Field of Search ........................... 73/861.42, 861.51, 73/861.52, 861.61; 285/148.18, 382.1

(56) References Cited

U.S. PATENT DOCUMENTS

| | | | |
|---|---|---|---|
| 2,929,248 | * 3/1960 | Sprenkle | ........................ 73/861.52 |
| 3,071,160 | 1/1963 | Weichbrod . | |
| 3,129,587 | 4/1964 | Hallanger . | |
| 3,504,542 | 4/1970 | Blevins . | |
| 3,626,755 | 12/1971 | Rudolph . | |
| 3,674,292 | 7/1972 | Demler . | |
| 3,797,479 | 3/1974 | Graham . | |
| 3,838,598 | 10/1974 | Tomkins . | |
| 3,840,051 | * 10/1974 | Akashi et al. | .................... 73/861.52 |
| 3,877,735 | 4/1975 | Demler . | |
| 5,357,972 | 10/1994 | Norlien . | |
| 5,722,417 | 3/1998 | Garbe . | |
| 6,164,142 | * 12/2000 | Dimeff | .............................. 73/861.52 |

* cited by examiner

Primary Examiner—Harshad Patel
(74) Attorney, Agent, or Firm—Robert S. Kelly

(57) ABSTRACT

An air flow measurement device includes a connector conduit with a constant inner diameter wall for the air flow, a transverse restrictor plate located within the conduit with a plurality of generally uniformly spaced apertures extending therethrough, and an annular mounting piece secured centrally about the conduit for securely mounting a pair of air pipes to the opposite ends of the conduit in air-tight engagement therewith. The restrictor plate is maintained in the connector conduit by a swaging operation which causes it to be expanded outwardly into tight engagement with the conduit wall. A pair of tank valves are mounted, by a special saddle, to the mounting piece, and passages are provided through the mounting piece and conduit wall for communication with the interior of the conduit just upstream and downstream of the restrictor plate whereby a differential pressure meter may be connected to the valves to measure the difference in pressure to thereby determine the air flow rate.

9 Claims, 2 Drawing Sheets

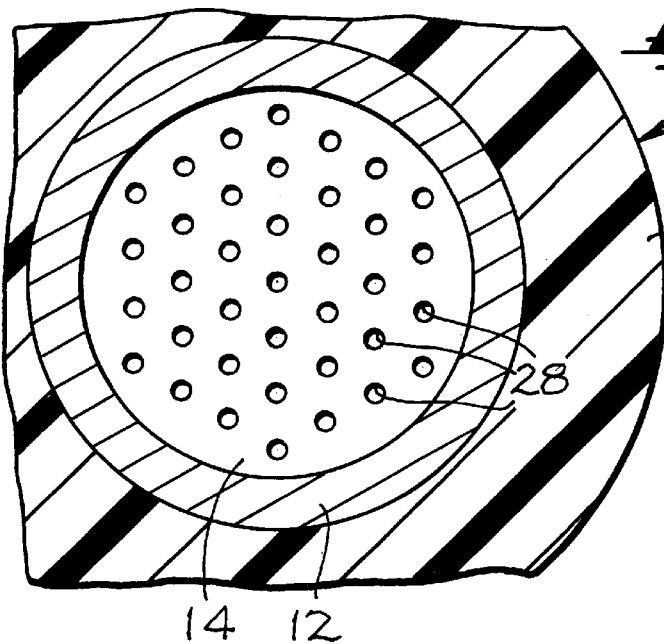
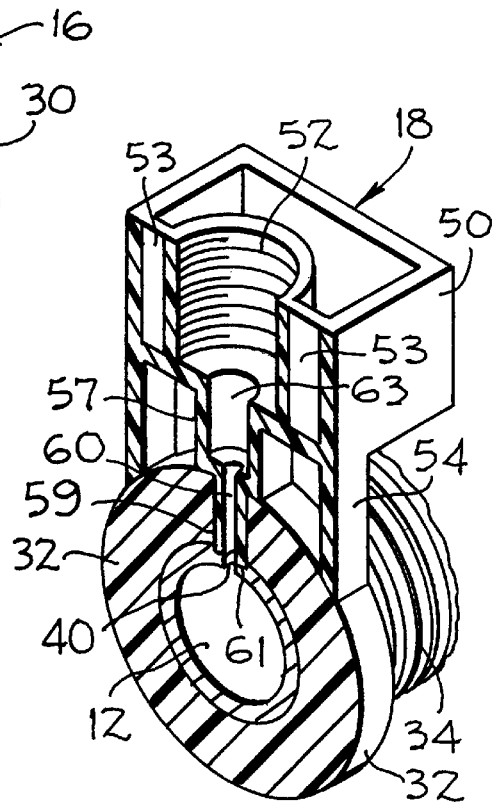
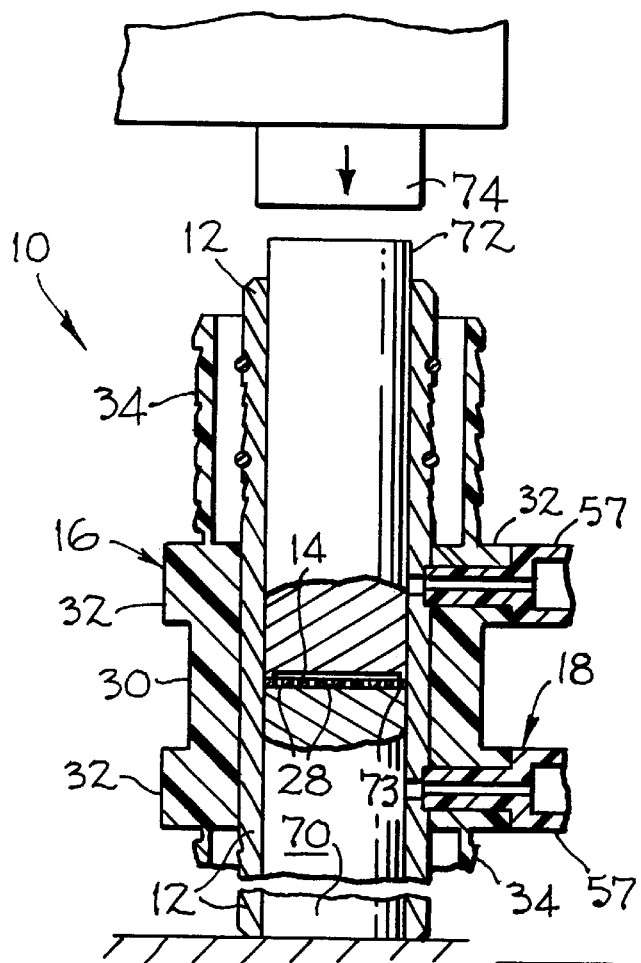
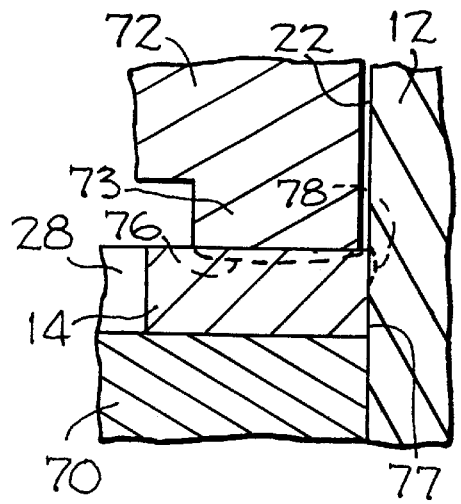

COMBINATION AIR PIPE CONNECTOR AND FLOW MEASUREMENT DEVICE

BACKGROUND OF THE INVENTION

1. Field of the Invention

The present invention pertains to head flowmeters for measuring the air or gas flow rates through conduits, especially at low flow rates, and more particularly, it pertains to head flowmeters of the type which attempt to minimize the generated turbulence in the flow measurement area by presenting a restriction with a plurality of closely spaced orifices to the air flow and measuring the pressure drop thereacross in order to determine the flow rate.

2. Description of the Prior Art

In one type of conventional flowmeter, sometimes referred to as a head flowmeter, particularly for measuring the flow of air or other gases, a device designed to introduce a slight resistance to the flow of the air is placed within a conduit through which the air is flowing. As is well-known in head flowmeters, the flow rate can be directly measured within a pre-calibrated range in a given conduit and at a given temperature and pressure by measuring the pressure drop across a restrictive orifice or plurality of orifices since flow is proportional to the square root of the differential pressure across the restriction. Thus, the difference between the pressures appearing at the wall of the conduit sections just upstream and downstream of the flow impeding device is measured, and the magnitude of that pressure difference is directly utilized to determine the flow rate of the air (in standard cubic feet per hour, SCFH, for example) flowing through the conduit (i.e., the greater the pressure differential, the greater the flow). In its simplest form, the flow impeding device may be formed by a thin plate mounted perpendicularly to the axis of the air flow conduit in such a manner so as to force the entire flow of air through an orifice machined in the plate and located on the centerline of the conduit. In order to reduce the turbulence at the flow impedance device, which can result in inconsistent and erroneous readings in the output of the flowmeter, a plurality of generally uniformly distributed orifices may be provided in the orifice plate, which thus may come to resemble a screen. In fact, many prior art arrangements have used a conventional woven screens for the flow impeding devices with pressure taps being provided just upstream and downstream of the screen to monitor the differential pressure and hence the flow rate.

Prior art air flow measuring devices of the foregoing type which have used typical screens of the woven mesh type to provide the plurality of restricted orifices across the air flow path are shown, for example, in U.S. Pat. No. 3,504,542 to Blevins, U.S. Pat. No. 3,626,755 to Rudolph, U.S. Pat. No. 3,797,479 to Graham and U.S. Pat. No. 5,357,972 to Norlien. With woven mesh type screens, however, an air flow problem on the upstream side of the screen is presented since the air flow (particularly at low flow rates) tends to follow the undulations of the weave at the mesh openings. This results in a tendency to create a circular air pattern about each of the openings in the mesh which vary in accordance with the air flow velocities and thereby hinder accurate readings of flow rate over a suitable range.

Other prior art flowmeter devices of the type described have provided elongated tubular configurations (such as those shown in U.S. Pat. No. 3,071,160 to Weichbrod and U.S. Pat. No. 3,838,598 to Tompkins) for the flow restriction, which for various reasons have not proven to be wholly satisfactory.

Finally, flat plate restrictors have been used with multiple spaced orifices therein such as shown, for example, in U.S. Pat. No. 5,722,417 to Garbe and U.S. Pat. No. 3,129,587 to Hallanger. Such devices have not proven to be easily manufacturable and readily adaptable for use in various environments, such as in the measuring of relatively low air flow in underground conduits for the pressurization of telephone cables or the like.

SUMMARY OF THE INVENTION

The flow measurement device of the present invention utilizes a flat plate restrictor with a plurality of generally uniformly spaced orifices whereby flow turbulence at the measuring location is minimized and the total flow is generally smoothed as it passes through the restrictor plate. Such a multiple aperture and flat plate design will act as a hybrid device simultaneously providing the functions of a smoothing screen to reduce turbulence, a contouring screen to adjust the radial distribution of flow, and a calibrated restriction as required for use with a head flowmeter type of air flow measurement device. Furthermore, the present invention combines the functions of an air pipe connector and an air flow measurement device so that the measurement device can be readily connected in a quick and easy manner to split ends of conventional air pipe tubing.

Thus, the combination air pipe connector and air flow measurement device of the present invention includes a cylindrical conduit having a constant inner diameter and a thin flat orifice plate secured transversely to the conduit within the inner wall thereof, preferably by swaging the plate into the wall, so that no further flow distorting elements, such as sleeves, retaining walls, etc., are required in the flow passage in order to maintain the orifice plate in the conduit. A mounting member about the outer surface of the conduit provides a pair of oppositely disposed cylindrical recesses within which the split ends of conventional air tubing can be inserted and tightly secured in air tight engagement therewith. Aligned radial passages are provided through the mounting member and the conduit to connect the flow passage through the conduit just upstream and downstream of the orifice plate with a pair of valves to which a conventional differential pressure meter may be connected for determining the air flow rate through the device.

With the aforedescribed arrangement, the-ratio of the combined cross-sectional areas of the passages in the orifice plate to the total area of the orifice plate face (including the passages) may be kept quite low, e.g., from three to twenty-five percent, so as to substantially improve the sensitivity of the flow rate measuring device as compared to other conventional devices and thereby render it effective for reading air flow rates at varying low levels, e.g., less than twenty SCFH.

In order to appropriately mate the pressure differential valves with the mounting member and conduit combination, a special saddle member may be provided which can be sealed to the mounting member in air-tight engagement and which includes a pair of cylindrical projecting portions which may extend downwardly into the conduit in a locked and sealed arrangement therewith to render the entire combination air-tight.

BRIEF DESCRIPTION OF THE DRAWINGS

FIG. 2 is an enlarged section taken along line 2—2 of FIG. 1, with a portion thereof being broken away, particularly showing the arrangement of the apertures or flow passages in the orifice plate.

FIG. 2A is a reduced perspective view of a section taken generally along the line 2A—2A of FIG. 1, with a portion of the measurement device being broken away.

FIG. 3 is a longitudinal section of the combination air pipe connector and flow measurement device of FIG. 1 during the construction thereof particularly illustrating the manner in which the orifice plate is swaged into the internal wall of the conduit and including a diagrammatic illustration of the swaging tools.

FIG. 4 is a greatly enlarged detail section of the edge of the orifice plate and the inner wall of the conduit where the swaging tool is utilized to expand the plate into the conduit wall.

DESCRIPTION OF THE PREFERRED EMBODIMENT

Figure 1:
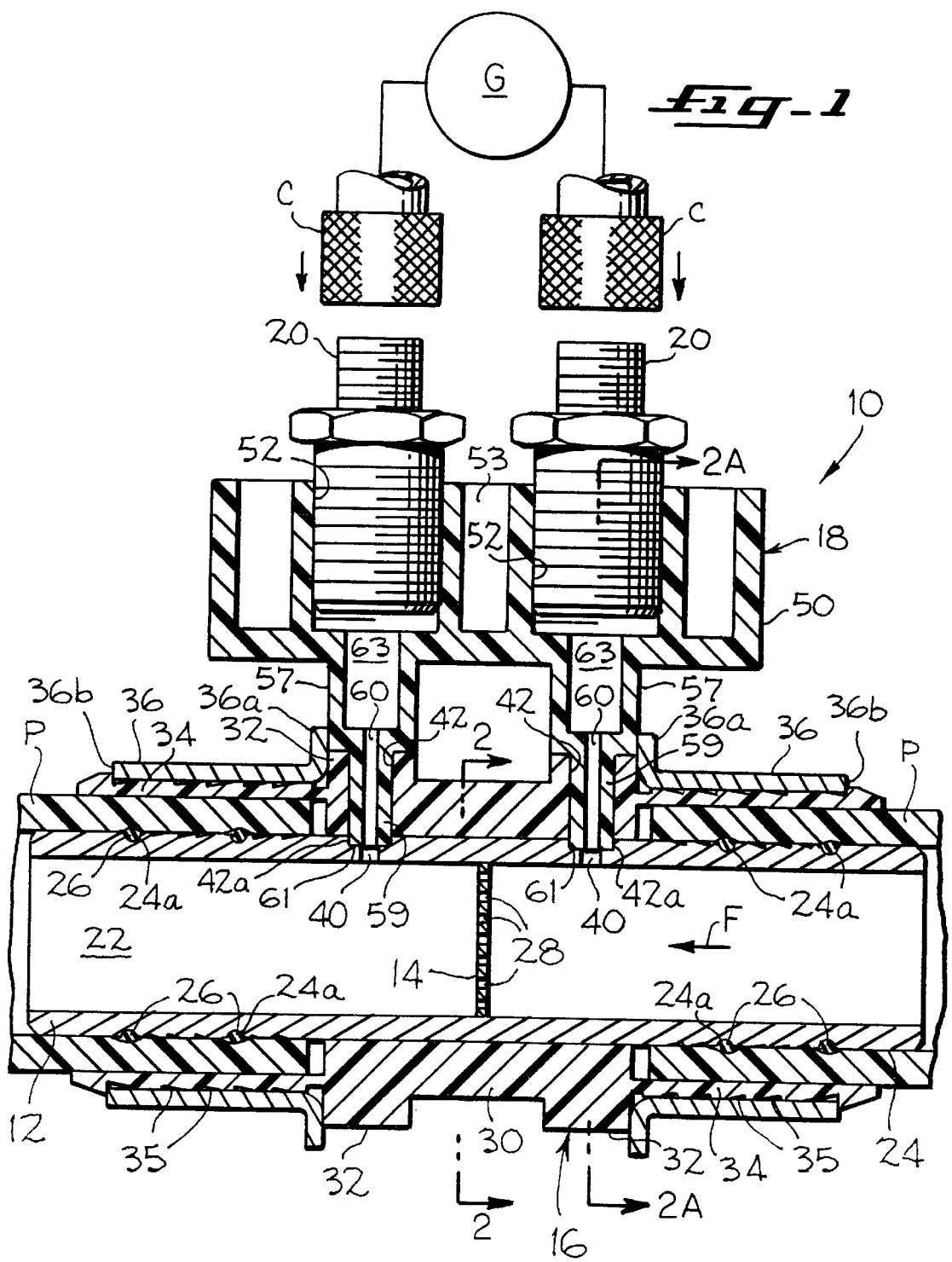
FIG. 1 is a longitudinal section through the combination air pipe connector and flow measuring device of the present invention showing the device as attached to a pair of split ends of conventional air pipe tubing.

The present invention is particularly designed for measuring relatively low air flow rates, e.g., zero to two hundred SCFM (standard cubic feet per hour) in cylindrical conduits, e.g., the measurement of air flow in underground air pipes for telephone cables or the like.

FIG. 1 illustrates, in cross-section, the combination air pipe connector and flow measurement device 10 of the present invention as it is used to connect and measure the flow between the split ends of a pair of air pipes P. Measurement device 10 will be seen to be comprised of a conduit 12 having a flow restricting orifice plate 14 positioned transversely therein, a mounting member 16 secured about the central portion of the conduit 12 to provide for the air-tight interconnection of the split ends of the air pipes P, and a saddle member 18 which is secured to the outer periphery of mounting member 16 to provide for the mounting of a pair of tank valves 20 which may be connected to an external differential pressure gauge G (by means of conventional tubing) for determining the air flow rate through the conduit 12.

Conduit 12 is formed of a rigid metallic material, such as aluminum, and has a uniform and constant diameter inner cylindrical wall surface 22 and an outer cylindrical surface 24 which is provided with a series of circular grooves 24a at the outer ends thereof for the reception of a pair of compressible o-rings 26 used to tightly secure the ends of the air pipes P to the measurement device. The orifice plate 14 is positioned transversely of the passage formed by the inner wall surface 22 and has a diameter identical to that of the inner diameter of the conduit. The orifice plate is rigidly mounted within the inner wall surface of the conduit 12 by a swaging operation which will be explained in greater detail hereinafter. It will be noted, however, that there are no retaining devices, such as sleeves or the like, required in order to retain the orifice plate within the flow conduit; thus, the entire upstream face of the orifice plate may be subjected to the air flow F (FIG. 1) through the conduit. As can best be seen in FIG. 2, the flat faces of the orifice plate 14 are connected by a plurality of apertures or passages 28 which pass through the plate, and these apertures are arranged in a uniform evenly spaced arrangement throughout the face of the orifice plate exposed to the air flow.

The mounting member 16, which may be formed of a hard plastic material, such as nylon, includes a cylindrical central section 30 including a pair of outwardly projecting ribs 32 from which extend in opposed directions a pair of cylindrical end walls 34. As can be seen in FIG. 1, the end walls 34 are arranged to receive in tight engagement the ends of the air pipes P to be interconnected with the air pipes being received in the cylindrical recess formed between the end wall 34 and the outer surface 24 of the conduit 12 with the O-rings 26 on the conduit being used to secure the air pipes P in air-tight engagement therein. When the ends of pipes P are inserted within the recesses formed by the end walls 34, flanged locking rings 36 are pushed onto and over the outer cylindrical surfaces of each of the end walls 34 until the flanges 36a thereof abut against the mounting member ribs 32 to tightly secure the air pipes P to the measurement device 10. It will be noted that the outer cylindrical surfaces of the end walls 34 over which the locking rings are pushed are provided with a plurality of spaced grooves 35 having radially extending faces (FIG. 1) which catch the outer ends 36b of the locking rings 36 and prevent the locking rings from slipping back off of the cylindrical end walls 34. Thus, a solid connection is assured which will not become disconnected during usage.

The saddle member 18, which is best shown in FIG. 1 and the perspective view of FIG. 2A and which may be formed of a hard plastic material similar to that of the mounting member 16, is provided to permit the interior of the air flow conduit 12 to be connected to an external differential pressure gauge G to determine the air flow rate in the conduit in the conventional manner by measuring the pressure drop across the orifice plate 14. For this purpose, a pair of radial passages 40 are provided in the wall of conduit 12 just upstream and downstream of the orifice plate 14, as is clearly shown in FIG. 1. Then, a pair of aligned passageways 42, of slightly larger diameter than the passages 40, are provided radially through the ribs 32 of the mounting member 16 for the reception of the saddle member 18. The latter will be seen to be comprised of an upper box-like frame structure 50 having a pair of spaced cylindrical sockets 52 therein with internal threading for the reception of the tank valves 20, such sockets being maintained in position in the saddle member by a plurality of web members 53 as shown. Extending from the frame structure 50 below each of the sockets 52 is a cylindrical projection having an inner cylindrical portion 57 with a curved lower face (FIG. 2A) adapted to seat upon the outer face of the associated rib 32 and a smaller diameter outer cylindrical portion 59 adapted to be tightly received in the radially extending passageway 42 through the rib. The cylindrical projections of the saddle member are enclosed within a lower box-like frame structure 54 (FIG. 2A) which is securely affixed to the outer cylindrical surfaces of the ribs 32.

As can be clearly seen in FIG. 1, the radially extending passageways 42 in the ribs are extended into the wall of the conduit 12 for a short distance 42a. A narrow diameter passageway 60 within the cylindrical portion 59 extends from the lower cylindrical end 61 of each of the saddle member projections up into the interior 63 of the upper portion 57 of the projection where it communicates with the interior of the associated socket 52. In order to insure an air-tight seal in the aforedescribed arrangement, the bottom cylindrical surfaces 61 are securely sealed, as by a suitable adhesive, to the outwardly facing cylindrical surface of the conduit 12 which surrounds the passageway 40 therethrough.

The conventional tank valves 20 are threaded into the sockets 52 for air tight engagement therewith. The tank valves may be of the common type as used in bicycles or automobile tires wherein a spring-loaded closure maintains the valve closed until a connector is threaded onto the outer end of the valve to release the closure and communicate with the air within the valve.

As pointed out hereinbefore the orifice plate 14 is adapted to be rigidly mounted within the inner wall of the conduit 12 by means of a swaging operation so that no further sleeves or retaining devices are required whereby the uniform distribution of orifices or passageways 28 may be extended across the entire face of the orifice plate and no obstructions are provided to block the normal flow of air through the conduit 12 other than that provided by the orifice plate itself.

The swaging operation and the tools for accomplishing the same are shown in FIGS. 3 and 4 of the drawings. Referring to FIG. 3, it will be noted that after the saddle member 18 has been mounted upon and tightly secured to the mounting member 16, one end of the assembly is slipped over a cylindrical anvil 70 having an external diameter approximately the same as the internal diameter of the conduit 12. The anvil extends within the conduit to the approximate center thereof where the orifice plate 14 is then positioned (as shown is FIG. 3). A swaging tool 72 of cylindrical shape is then inserted into the upper portion of the conduit 12 so that a narrow cylindrical rim 73 (FIG. 4) at the bottom edge of the tool 72 rests against the outer circumferential edge of the orifice plate 14. As can be seen in FIG. 4, the swaging tool 72 is just very slightly spaced from the interior wall of the conduit by a distance of about 0.001 to about 0.002 inches. A hammer 74 is then dropped down to strike the upper end of the swaging tool 72 with a predetermined amount of force as shown by the arrow in FIG. 3. This sharp force delivered to the outer circumferential edge of the orifice plate will cause a slight depression 76 (FIG. 4) in such outer circumferential edge, but more importantly, it will cause the outwardly facing side edge 77 of the orifice plate to bulge slightly at its upper edge, as shown at 78, into the interior wall of conduit 12 so as to form a tight interlocked engagement therewith.

When it is desired to read the air flow F (FIG. 1) through the air pipes P and conduit 12, the differential gauge G is selectively connected to the valves by means a pair of standard threaded connectors C. The differential pressure upstream and downstream of the orifice plate is then determined, and, since the volume of air per linear distance through the tubing and the temperature and nominal pressure thereof are known, the change in pressure when the air is forced to flow through a predetermined reduction in passage size can be utilized in the well-known manner to permit the meter G to be calibrated to obtain a reading for the air flow rate.

Although the size and spacing of the apertures 28 in the orifice plate 14 may be varied so as to achieve optimal results for a particular air flow to be measured, in measuring air flows with the device of the present invention it has been found that with an internal conduit 12 diameter of about 0.4375 inches and an aperture diameter of 0.024 inches, a total of 37 orifices may be provided through the orifice plate in a uniformly spaced arrangement as shown in FIG. 2 with the center-to-center spacing of the apertures being 0.065 inches. This arrangement permits air flow readings of from 0 to 100 SCFH with a total aperture to total plate area (including the apertures) ratio of about 11 percent. By increasing the aperture diameter to about 0.034 inches in the same uniformly spaced arrangement, the device 10 of the present invention can be used for air flows of 0 to 200 SCFH with an aperture-to-plate ratio of about 22 percent, and by decreasing the aperture diameter to about 0.012 inches in the same uniformly spaced arrangement, the device 10 of the present invention can be accurately used for air flows of 0 to 20 SCFH with an aperture-to-plate ratio of about 3 percent. With the smoothing operation provided by the device 10 of the present invention, accurate readings may be obtained for very small pressure drops across the orifice plate 14, e.g., less than about 0.03 psi.

The orifice plate 14 may be formed of a thin sheet of brass or aluminum with the apertures 28 therethrough being machined by drilling, punching, electroforming, or by means of either laser or chemical milling. As noted, these apertures should be uniformly spaced in rows in all directions so that all apertures are equidistant from each other.

In the swaging operation, with an orifice plate 14 of preferably about 0.005 inches in thickness, the cylindrical rim 73 of the swaging tool 72 should be about 0.010 to about 0.012 inches in width thereby striking the orifice plate only at the very outermost edge. While the apertures 28 should be distributed in an equally spaced arrangement throughout the orifice plate, partial apertures should not be located at the periphery of the orifice plate as the swaging operation may not be effective and distortion of the plate may occur which could lead to inaccuracies in the ultimate output readings of the device of the present invention. A seen in FIG. 4 the rim 73 of the swaging tool is narrow so that, preferably, the apertures 28 in the orifice plate are not in the swaged area.

Although the best mode contemplated for carrying out the present invention has been herein shown and described, it will be apparent that other modifications and variations may be made without departing from what is regarded to be the subject matter of the invention.

What is claimed is:

1. A combination air pipe connector for connecting a pair of air pipes and flow measurement device comprising a rigid cylindrical conduit having opposed ends for connecting the air flow between the spaced ends of said air pipes, said conduit having an inner wall, means for respectively securing the ends of the air pipes in tight sealed engagement about the opposed ends of the conduit, a flat orifice plate having a flat upstream face and a flat downstream face in opposed relationship thereon and a plurality of generally uniformly spaced passages extending therebetween and generally throughout the area of the faces, said orifice plate being rigidly fixed within the inner wall of the conduit, a mounting member having a central portion thereof secured about the conduit and the orifice plate therein and a pair of cylindrical end portions extending outwardly of the central portion in parallel spaced relationship to the outer wall of the conduit so as to provide a pair of cylindrical recesses for the reception of said spaced ends of the air pipes, said central portion of the mounting member and said conduit each being provided with a pair of radially extending passageways aligned so as to respectively communicate with the air in the conduit directly adjacent to the upstream and downstream faces of said orifice plate, said passageways having outer ends spaced radially outward of the conduit, and a pair of spaced valves mounted upon the central portion of the mounting member at the outer ends of the radially extending passageways, said valves being arranged for coupling to a differential pressure meter for determining the pressure difference across said orifice plate in order to determine the air flow rate therethrough.

2. A combination air pipe connector and flow measurement device according to claim 1 wherein the ratio of the combined cross-sectional areas of the passages in said orifice plate to the total area including the passages of an orifice plate face exposed to the air flow is in the range of from about three to about twenty-five percent.

3. A combination air flow connector and flow measurement device according to claim 1 including a saddle member mounted upon said mounting member, said saddle member being provided with a pair of spaced passageways aligned with the passageways in said mounting member and having radially outer ends with the outer ends of the saddle member passageways being provided with means for the reception of said valves.

4. A combination air pipe connector and flow measurement device according to claim 3 wherein said saddle member is provided with a pair of tubular projections with each projection enclosing a portion of one of the passageways of the saddle member, said projections being received in air-tight engagement within the radially extending passageways of the mounting member.

5. A combination air pipe connector and flow measurement device according to claim 4 wherein said tubular projections extend through said mounting member and into air-tight sealed engagement with the radially extending passageways of said conduit.

6. A combination air pipe connector and flow measurement device according to claim 1 wherein said conduit and said orifice plate are both formed of a metallic material and are rigidly fixed together by a swaging operation which causes the outer circumferential edge of the plate to be expended into locked engagement with the inner wall of the conduit.

7. A combination air pipe connector for connecting a pair of air pipes and flow measurement device comprising a cylindrical conduit for connecting the air flow between the spaced ends of said air pipes, said conduit having a constant diameter inner wall, means for respectively securing the ends of the air pipes in tight sealed engagement about the opposed ends of the conduit, a flat orifice plate having a flat upstream face and a flat downstream face in opposed relationship thereon and a plurality of generally uniformly spaced passages extending therebetween and generally throughout the area of the faces, said orifice plate being rigidly fixed within the inner wall of the conduit without the addition of any additional retaining structure at the outer edge thereof so that said inner wall extends to the faces of the orifice plate, a mounting member having a central portion thereof secured about the conduit and the orifice plate therein and a pair of cylindrical end portions extending outwardly of the central portion in parallel spaced relationship to the outer wall of the conduit so as to provide a pair of cylindrical recesses for the reception of said spaced ends of the air pipes, said central portion of the mounting member and said conduit each being provided with a pair of radially extending passageways aligned so as to respectively communicate with the air in the conduit directly adjacent to the upstream and downstream faces of said orifice plate, said passageways having outer ends spaced radially outward of the conduit, and a pair of spaced valves mounted upon the central portion of the mounting member at the outer ends of the radially extending passageways, said valves being arranged for coupling to a differential pressure meter for determining the pressure difference across said orifice plate in order to determine the air flow rate therethrough.

8. A combination air pipe connector and flow measurement device according to claim 7 wherein the ratio of the combined cross-sectional areas of the passages in said orifice plate to the total area including the passages of an orifice plate face exposed to the air flow is in the range of from about three to about twenty-five percent.

9. A combination air pipe connector and flow measurement device according to claim 7 wherein said orifice plate is mounted within the conduit by swaging the outer circumferential edge of the plate into the inner wall of the conduit.

* * * * *